United States Patent
Huang

(10) Patent No.: US 11,324,169 B2
(45) Date of Patent: May 10, 2022

(54) GARDEN SHEARS

(71) Applicant: HO CHENG GARDEN TOOLS CO., LTD., Chang Hua Hsien (TW)

(72) Inventor: Yao-Chung Huang, Chang Hua Hsien (TW)

(73) Assignee: HO CHENG GARDEN TOOLS CO., LTD., Chang Hua Hsien (TW)

(*) Notice: Subject to any disclaimer, the term of this patent is extended or adjusted under 35 U.S.C. 154(b) by 0 days.

(21) Appl. No.: 16/997,355

(22) Filed: Aug. 19, 2020

(65) Prior Publication Data

US 2022/0053704 A1 Feb. 24, 2022

(51) Int. Cl.
| | | |
|---|---|---|
| *A01G 3/02* | (2006.01) | |
| *B26B 13/28* | (2006.01) | |
| *A01G 3/025* | (2006.01) | |
| *B23D 29/02* | (2006.01) | |
| *A01G 3/047* | (2006.01) | |

(52) U.S. Cl.
CPC ............. *A01G 3/021* (2013.01); *A01G 3/025* (2013.01); *A01G 3/0475* (2013.01)

(58) Field of Classification Search
CPC ...... A01G 3/02; A01G 3/0475; A01G 3/0251; A01G 3/021; B26B 13/26; B26B 13/285; B26B 13/06; B23D 29/02
See application file for complete search history.

(56) References Cited

U.S. PATENT DOCUMENTS

| | | | | |
|---|---|---|---|---|
| 6,829,829 B1* | 12/2004 | Huang | ................. | A01G 3/0475 30/193 |
| 8,225,513 B2* | 7/2012 | Huang | ..................... | A01G 3/02 30/254 |
| 8,661,691 B2* | 3/2014 | Huang | ................. | A01G 3/0251 30/254 |
| 2010/0269357 A1* | 10/2010 | Shan | ..................... | A01G 3/0251 30/254 |
| 2012/0060377 A1* | 3/2012 | Huang | ................. | A01G 3/0251 30/244 |
| 2016/0120132 A1* | 5/2016 | Hsu | ......................... | A01G 3/021 30/251 |
| 2016/0133208 A1* | 5/2016 | Huang | ................... | G02B 30/25 345/214 |

* cited by examiner

*Primary Examiner* — Ghassem Alie

(57) ABSTRACT

A garden shears has a first blade member, a second blade member, a controlling handle and a protecting member. The first blade member has a first cutting portion, a first aperture at a middle section, a first toothed section adjacent to the first aperture and below the first cutting portion. The second blade member has a second cutting portion, a second aperture at a middle section, a third aperture at a lower end. The controlling handle has a driving member with a fourth aperture and the second toothed section on a top edge at an upper section. The protecting member has a main body with two opposing ear portions, each ear portion having a fifth aperture and a sixth aperture.

7 Claims, 8 Drawing Sheets

A-A

GARDEN SHEARS

BACKGROUND OF INVENTION

Field of Invention

The present invention relates to a garden shears, and more particularly to a two-handed style garden shears

Description of Related Art

Accordingly, current garden shears have two opposite cutting blades. A long rod-shaped handle below the cutting blades and each middle section of the handle is provided with a through aperture and pivoted together by a nut and a screw through the aperture. When force is applied to the handle, the aperture can be used as the axis to make the cutting blade open and close.

However, the above-mentioned conventional structure still has the following problems in practical applications: the opening that the garden shears can provide is limited, so the garden shears cannot be used for pruning thicker branches.

Therefore, it is desirable to provide a garden shears to mitigate and/or obviate the aforementioned problems.

SUMMARY OF INVENTION

An objective of present invention is to provide a shelf structure, which is capable of improving the above-mention problems.

In order to achieve the above mentioned objective, a garden shears has a first blade member, a second blade member, a controlling handle and a protecting member. The first blade member has a first cutting portion, a first aperture at a middle section, a first toothed section adjacent to the first aperture and below the first cutting portion. The second blade member has a second cutting portion, a second aperture at a middle section, a third aperture at a lower end. The controlling handle has a driving member with a fourth aperture and the second toothed section on a top edge at an upper section. The protecting member has a main body with two opposing ear portions, each ear portion having a fifth aperture and a sixth aperture.

Other objects, advantages, and novel features of invention will become more apparent from the following detailed description when taken in conjunction with the accompanying drawings.

DETAILED DESCRIPTION OF PREFERRED EMBODIMENT

Figure 1:
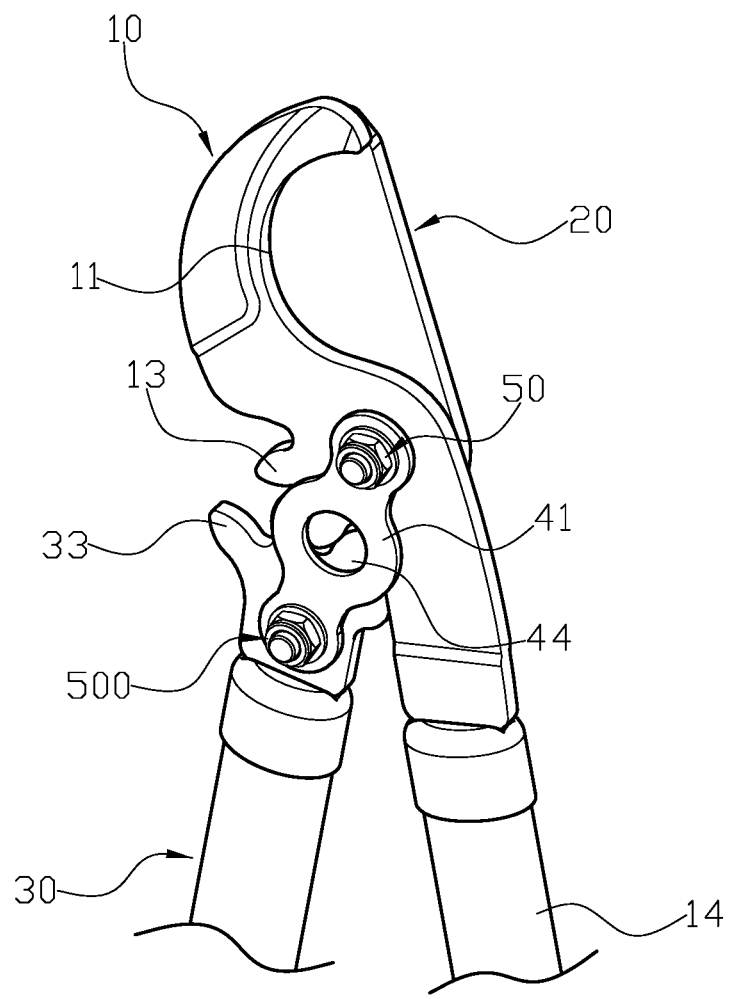
FIG. 1 is a three-dimensional combined drawing according to a preferred embodiment of the present invention.
Figure 2:
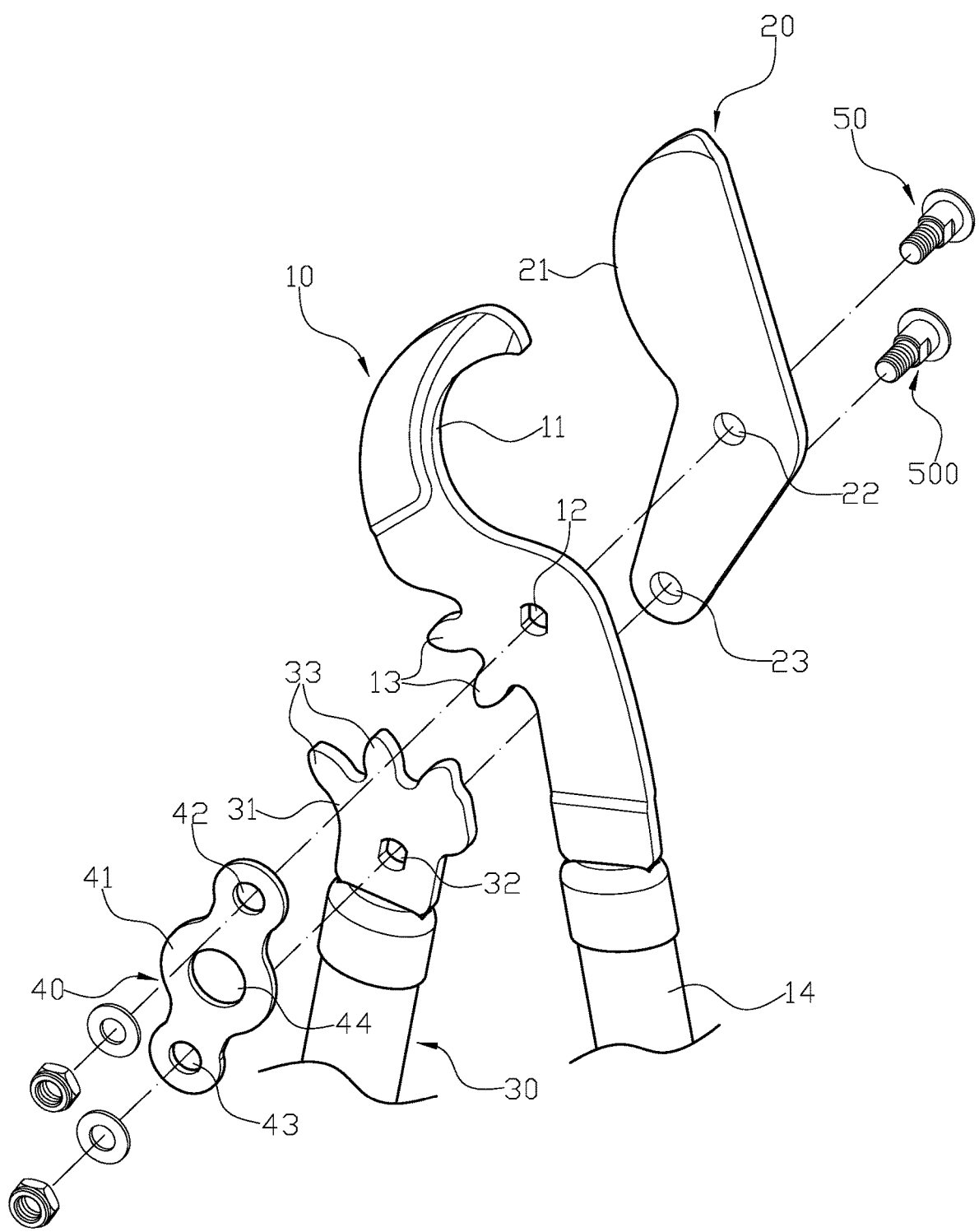
FIG. 2 is a three-dimensional exploded view according to the preferred embodiment of the present invention.
Figure 3:
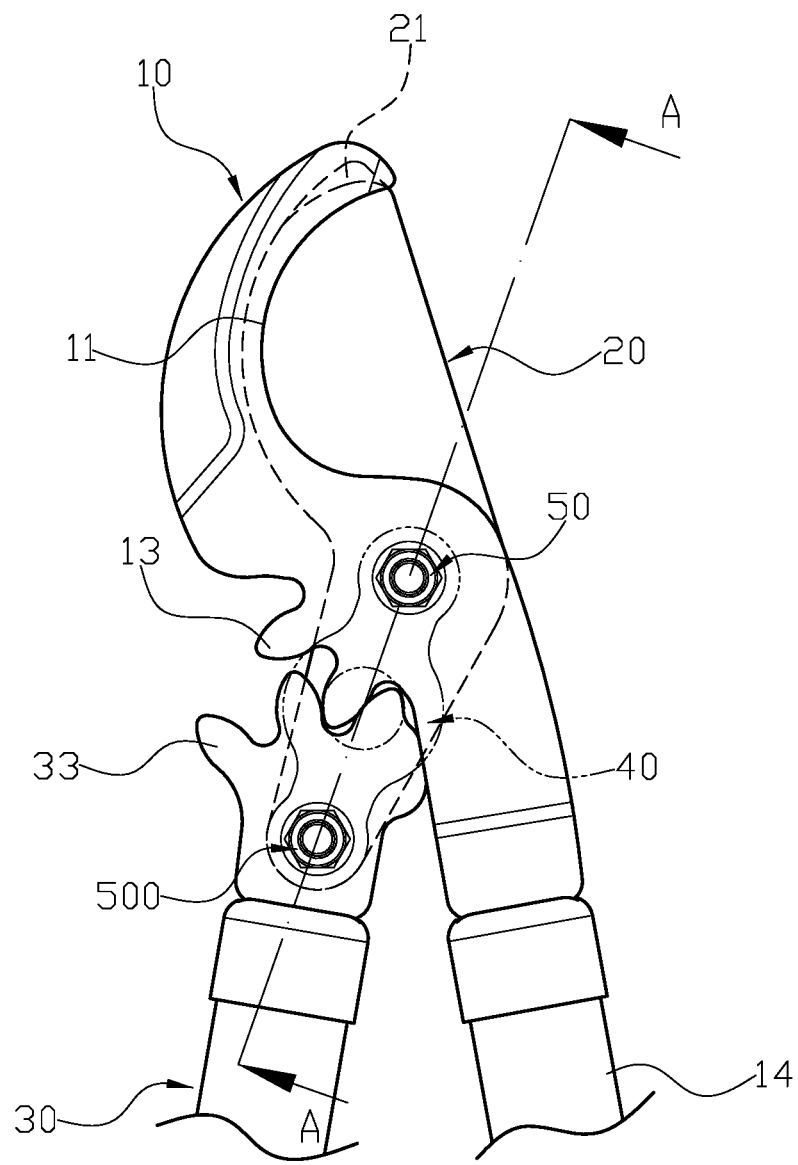
FIG. 3 is the schematic drawing according to the preferred embodiment of the present invention.
Figure 4:
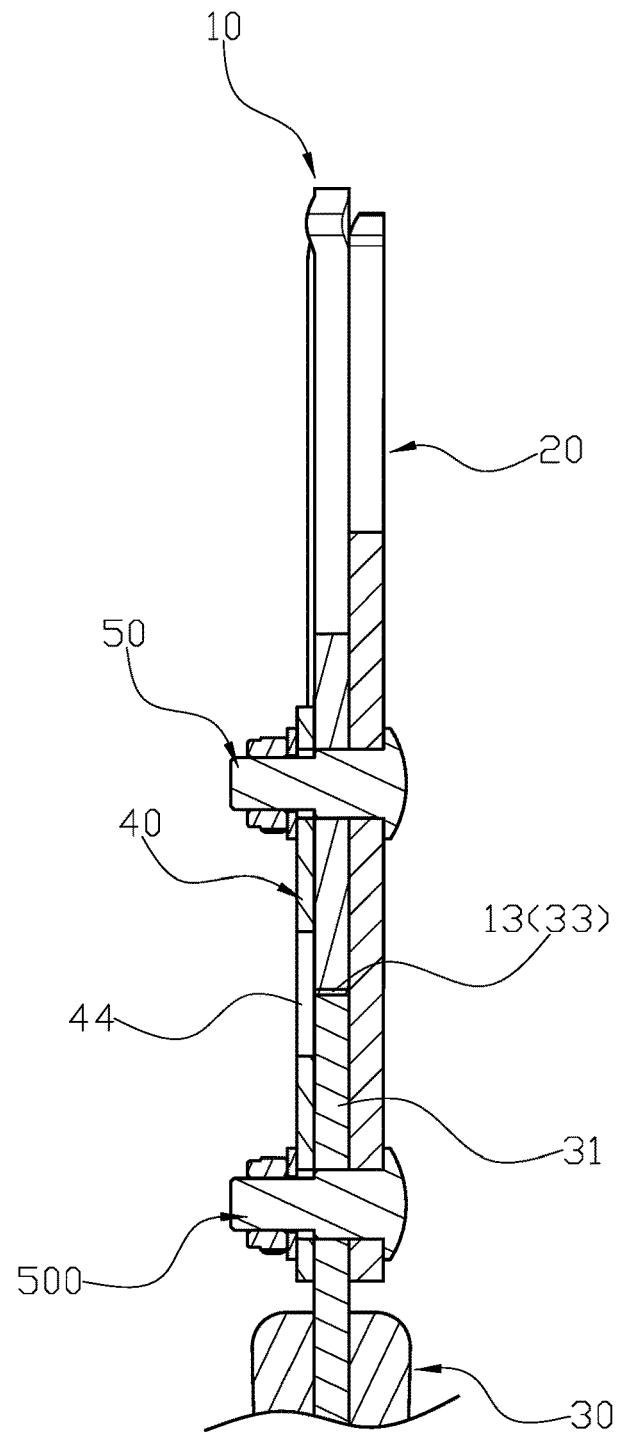
FIG. 4 is a cross-sectional view of line A-A in FIG. 3 according to the preferred embodiment of the present invention.

Please refer to FIGS. 1-4. A garden shears comprises a first blade member 10, a second blade member 20, a controlling handle 30 and a protecting member 40. The first blade member 10 has a first cutting portion 11, a first aperture 12 at a middle section, a first toothed section 13 adjacent to the first aperture 12 and below the first cutting portion 11 such that the first toothed section 13 is capable of engaging with a second toothed section 33 of the controlling handle 30. Furthermore, a handle 14 is connected to the first blade member 10. The second blade member 20 has a second cutting portion 21, a second aperture 22 at a middle section, a third aperture 23 at a lower end, a first pivoting member 50 passing through the second aperture 22 and the first aperture 12 to pivotably connect the second blade member 20 and the first blade member 10 together. Therefore, the second cutting portion 21 of the second blade member 20 is configured to rotate around the first cutting portion 11 of the first blade member 10. The controlling handle 30 has a driving member 31 with a fourth aperture 32 and a second toothed section 33 on a top edge at an upper section, and the second toothed section 33 of the controlling handle 30 engage with the first toothed section 13 of the first blade member 10. A second pivoting member 500 is inserted through the third aperture 23 and the fourth aperture 32, such that the controlling handle 30 is capable of rotating around the second blade member 20.

The protecting member 40 has a main body 41 with two opposing ear portions, each ear portion has a fifth aperture 42 and a sixth aperture 43. The protecting member 40 is mounted on the first blade member 10 on a side other than the same side as the second blade member 20. Moreover, a first pivoting member 50 is inserted through the fifth aperture 42 to pivot the first blade member 10, the second blade member 20 and the controlling handle 30 together. Moreover, the second pivoting member 500 is inserted into the sixth aperture 43 to pivot the protecting member 40 between the first blade member 10 and the driving member 31 of the controlling handle 30. The protecting member 40 also provides limitation to the driving member 31 of the controlling handle 30 with the second blade member 20, so that the controlling handle 30 is securely assembled between the second blade member 20 and the protecting member 40.

In addition, the first cutting portion 11 and the second cutting portion 21 are corresponding blades.

Alternatively, the second cutting portion 21 is a blade, and the first cutting portion 11 is a corresponding anvil.

Furthermore, the first toothed section 13 and the second toothed section 33 respectively have multiple teeth.

Moreover, the main body 41 of the protecting member 40 has a through aperture 44 for discharging, to prevent obstacles from interfering and causing the first toothed section 13 and the second toothed section 33 jam together. Also the through aperture 44 reduces the contacting surface which resulting less resistance.

In addition, the first pivoting member 50 comprises a bolt and a nut combination.

Additionally, the second pivoting member 500 comprises a bolt and a nut combination.

Figure 5:
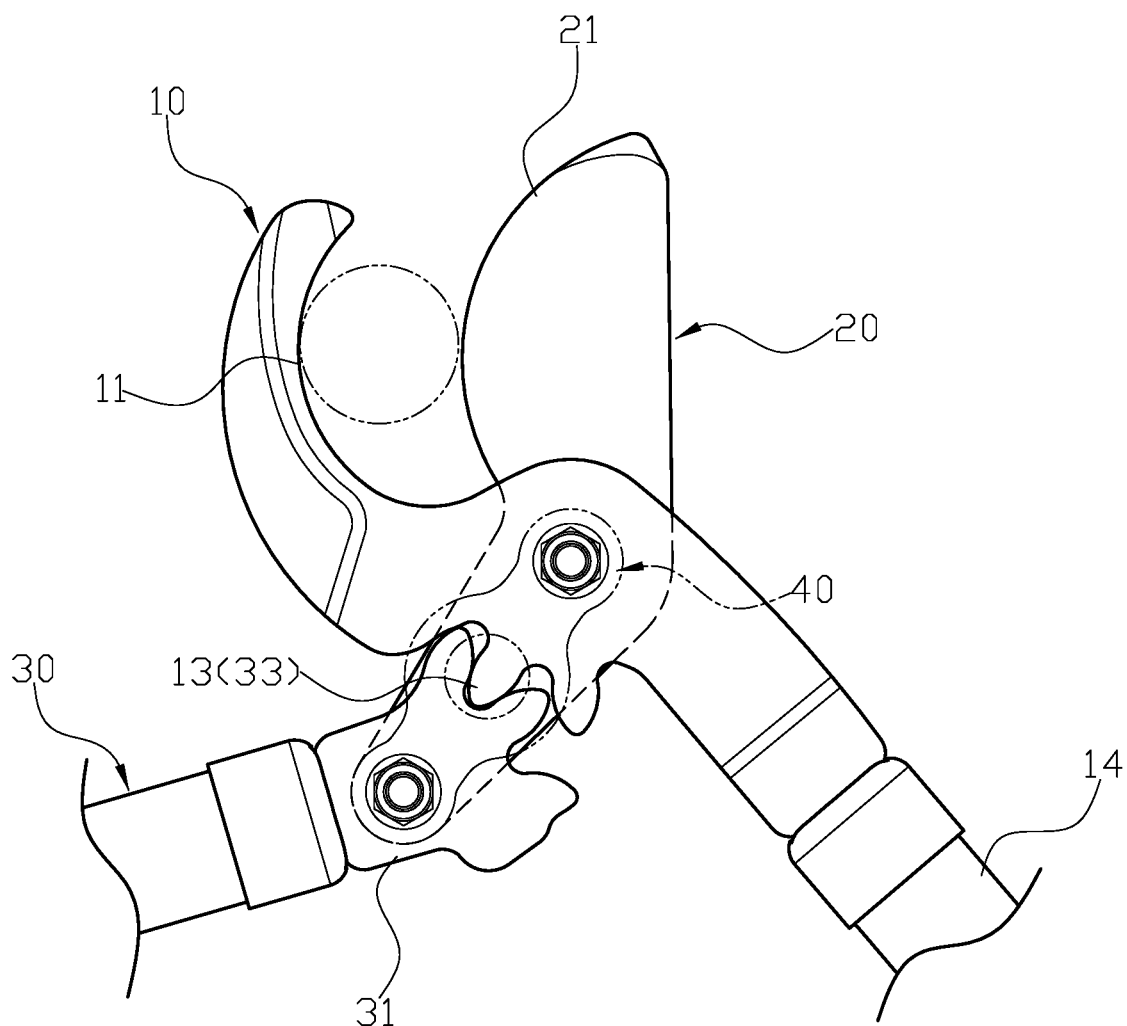
FIG. 5 is showing a thicker object being cut according to the preferred embodiment of the present invention.
Figure 6:
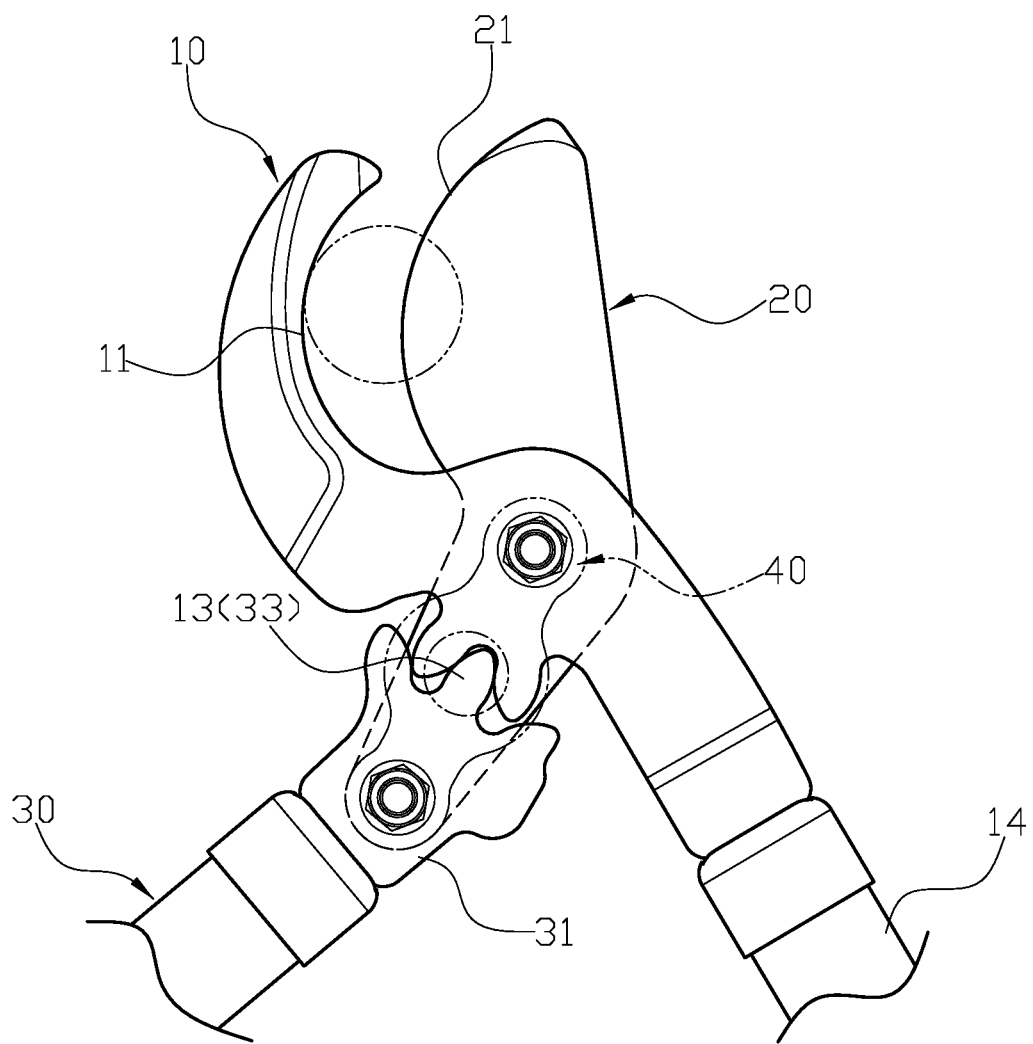
FIG. 6 is a schematic diagram showing cutting the middle position according to the preferred embodiment of the present invention.
Figure 7:
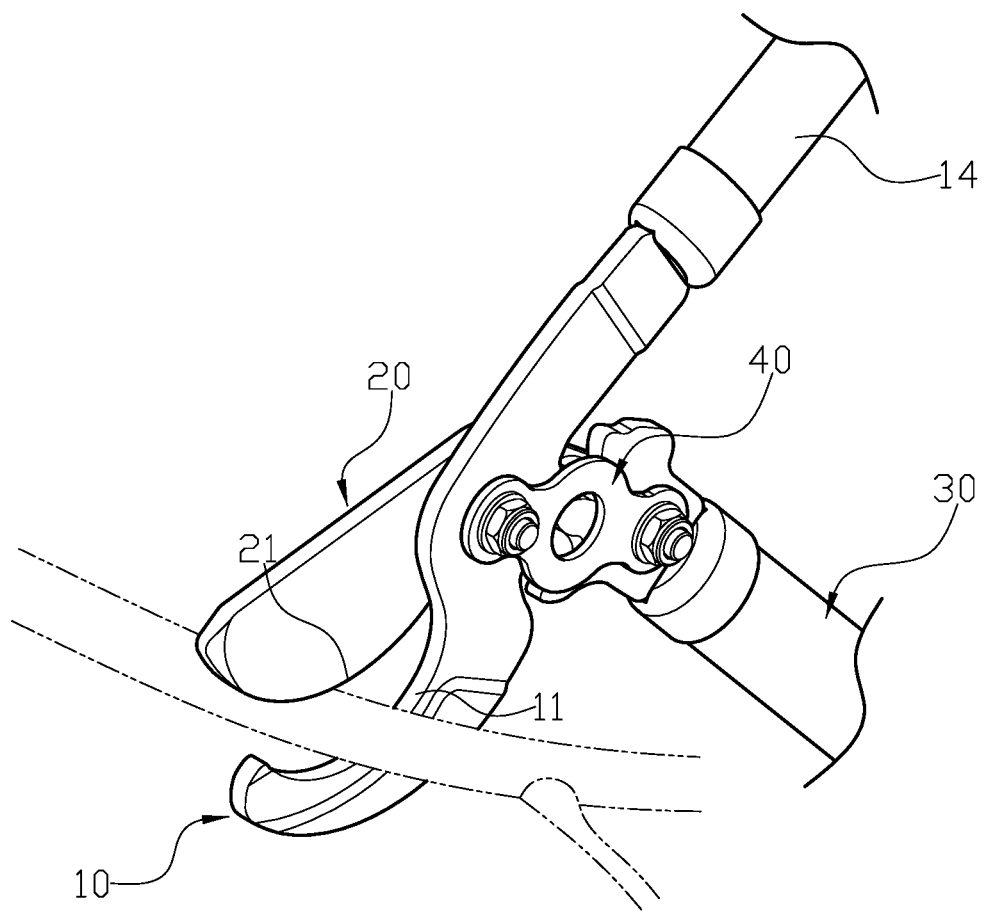
FIG. 7 is a three-dimensional schematic diagram showing cutting state according to the preferred embodiment of the present invention.
Figure 8:
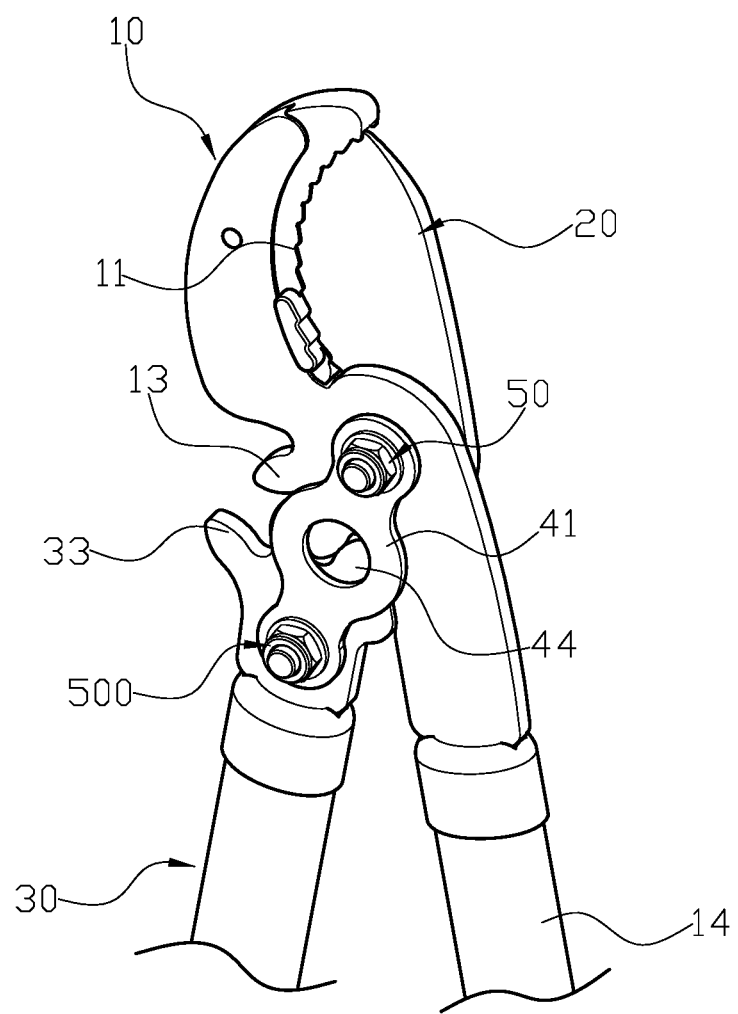
FIG. 8 is a drawing according to another preferred embodiment of the present invention.

As shown in FIGS. 5-7, when trimming objects such as flowers, plants, trees, etc., the handle 14 and the controlling handle 30 need to be held with each hand to rotate the controlling handle 30 outwardly via the second toothed section 33 the first toothed section 33. The toothed section 13 is turned outwards to gradually open the first cutting portion 11 and the second cutting portion 21 apart during the engagement process of the second toothed section 33 and the first toothed section 13. The open range can be enlarged through the engagement between the first toothed section 13 and the second toothed section 33, so that the thicker cut object can be easily inserted between the first cutting portion 11 and the second cutting portion 21. When the hands are pressed in the opposite direction, the leverage effect between the first toothed section 13 and the second toothed section 33 can be used to effectively cut objects. Because the rotation path of the controlling handle 30 driving the second blade member 20 from fully open to closed is effectively lengthened, so the shearing force is increased to achieve a more comprehensive use of branches and leaves.

With the structure of the above-mentioned specific embodiment, the following benefits can be obtained: 1. The structure of the garden shears can be used for trimming thicker cut objects and increase the shearing force, so the use of the above garden shears is more time-saving and labor-saving comprehensively. 2. With protecting member 40, the rotation of the controlling handle 30 is more stable, and it also prevents the controlling handle 30 from being cut too hard causing abnormal shaking or displacement. 3. With the protecting member 40, it prevents the operating hand from getting too close to the engagement the first toothed section 13 and the second toothed section 33 and being accidentally injured. 4. The protecting member 40 reinforces the pivot structure of the first blade member 10, the second blade member 20 and the controlling handle 30, so that the overall strength of the garden shears can is significantly improved. 5. The extension of the two ear portions of the protecting member 40 effectively disperse the force to prevent the stress under shearing from being concentrated on a single point.

Although the present invention has been explained in relation to its preferred embodiment, it is to be understood that many other possible modifications and variations can be made without departing from the spirit and scope of invention as hereinafter claimed.

What is claimed is:

1. A garden shears comprising: a first blade member, a second blade member, a controlling handle and a protecting member; wherein:

the first blade member has a first cutting portion at a first end and an opposing second end, a first aperture at a middle section between the first end and the second end, a first toothed section adjacent to the first aperture and below the first cutting portion such that the first toothed section is capable of engaging with a second toothed section of the controlling handle, and a handle rigidly connected to the second end;

the second blade member has a second cutting portion, a second aperture at a middle section, a third aperture at a lower end, a first pivoting member passing through the second aperture and the first aperture to pivotably connect the second blade member and the first blade member together, the second cutting portion of the second blade member configured to rotate around the first cutting portion of the first blade member;

the controlling handle has a driving member at a first end and an opposing second end, the second toothed section disposed on a top edge at an upper section of the driving member and extending upwardly towards the first cutting portion and the second cutting portion, a fourth aperture disposed in the driving member between the second toothed section and the second end of the controlling handle, the second toothed section of the controlling handle engaging with the first toothed section of the first blade member, a second pivoting member inserted through the third aperture and the fourth apertures, such that the controlling handle is capable of rotating around the second blade member; and the protecting member has a main body with two opposing ear portions, the ear portions having a respective fifth aperture and a sixth aperture, the protecting member mounted on the first blade member on a side opposite the second blade member, the first pivoting member inserted through the fifth aperture to pivot the first blade member, the second blade member and the controlling handle together, and the second pivoting member is inserted into the sixth aperture to pivot the protecting member between the first blade member and the driving member of the controlling handle.

2. The garden shears as claimed in claim 1, wherein the first cutting portion and the second cutting portion are corresponding blades.

3. The garden shears as claimed in claim 1, wherein the second cutting portion is a blade, and the first cutting portion is a corresponding anvil.

4. The garden shears as claimed in claim 1, wherein the first toothed section and the second toothed section respectively have multiple teeth.

5. The garden shears as claimed in claim 1, wherein the main body of the protecting member has a through aperture disposed in a middle portion of the main body and having a diameter larger than both of the ear portions.

6. The garden shears as claimed in claim 1, wherein the first pivoting member comprises a bolt, and a nut is connected to the bolt.

7. The garden shears as claimed in claim 1, wherein the second pivoting member comprises a bolt, and a nut is connected to the bolt.

* * * * *